United States Patent
Jo

(10) Patent No.: US 9,579,857 B2
(45) Date of Patent: Feb. 28, 2017

(54) METHOD FOR MANUFACTURING POLARIZING LENS AND POLARIZING LENS MANUFACTURED BY THE SAME

(71) Applicant: Jeong-ae Jo, Daejeon (KR)

(72) Inventor: Jeong-ae Jo, Daejeon (KR)

(73) Assignees: IZON OPTICS CO., LTD., Daejeon (KR); Jeong-Ae Jo, Daejeon (KR)

( * ) Notice: Subject to any disclaimer, the term of this patent is extended or adjusted under 35 U.S.C. 154(b) by 0 days.

(21) Appl. No.: 14/732,728

(22) Filed: Jun. 7, 2015

(65) Prior Publication Data
US 2016/0339656 A1 Nov. 24, 2016

(30) Foreign Application Priority Data
May 18, 2015 (KR) .................. 10-2015-0068712

(51) Int. Cl.
G02B 5/30 (2006.01)
B29D 11/00 (2006.01)
G02B 27/28 (2006.01)

(52) U.S. Cl.
CPC .. B29D 11/00413 (2013.01); B29D 11/00644 (2013.01); G02B 5/3033 (2013.01); G02B 27/281 (2013.01); B29K 2995/0034 (2013.01)

(58) Field of Classification Search
CPC ........ B29D 11/00413; B29D 11/00644; G02B 5/3033; G02B 27/28
USPC .................................................... 359/488.01
See application file for complete search history.

(56) References Cited

U.S. PATENT DOCUMENTS

| | | | | |
|---|---|---|---|---|
| 3,560,076 | A * | 2/1971 | Ceppi | B29C 43/021 156/102 |
| 5,219,497 | A * | 6/1993 | Blum | B29C 35/04 264/1.38 |
| 2002/0154406 | A1* | 10/2002 | Merrill | B32B 7/02 359/489.15 |
| 2007/0241313 | A1* | 10/2007 | Kato | G02B 3/00 252/585 |
| 2008/0180803 | A1* | 7/2008 | Seybert | C09D 201/005 359/642 |

(Continued)

FOREIGN PATENT DOCUMENTS

| | | |
|---|---|---|
| KR | 10-0964579 | 6/2010 |
| KR | 10-1280129 | 6/2013 |

OTHER PUBLICATIONS

English Specification of 10-0964579.
English Specification of 10-1280129.

*Primary Examiner* — Frank Font
(74) *Attorney, Agent, or Firm* — Antonio Ha & U.S. Patent, LLC

(57) ABSTRACT

A method for manufacturing a polarizing lens comprises taping an upper mold using first tape, applying a first resin composition onto a concave surface of the upper mold, forming a polarizing film on the first resin composition, performing first polymerization on the upper mold including the first resin composition and the polarizing film, spacing the upper mold apart from a lower mold, taping the upper mold and the lower mold using second tape, injecting a second resin composition into a space between the polarizing lens and the lower mold, and performing second polymerization on the upper mold including the gel-state upper lens coupled with the polarizing lens, the second resin composition, and the lower mold.

2 Claims, 3 Drawing Sheets

(56) References Cited

U.S. PATENT DOCUMENTS

| | | | | |
|---|---|---|---|---|
| 2012/0154910 A1* | 6/2012 | Yajima | ............ | B29D 11/00644 359/487.02 |
| 2014/0293217 A1* | 10/2014 | Ogaya | .................... | B29C 39/10 351/159.56 |
| 2015/0158259 A1* | 6/2015 | Yamamoto | ............... | G02C 7/12 264/1.32 |
| 2015/0293265 A1* | 10/2015 | Kawato | ................. | C08K 5/521 528/72 |
| 2016/0176131 A1* | 6/2016 | Ihara | ............... | B29D 11/00644 264/1.32 |

\* cited by examiner

METHOD FOR MANUFACTURING POLARIZING LENS AND POLARIZING LENS MANUFACTURED BY THE SAME

CROSS-REFERENCE TO RELATED APPLICATIONS

This patent application claims priority under 35 U.S.C. §119 to Korean Patent Application No. 10-2015-0068712, filed on May 18, 2015, in the Korean Intellectual Property Office, the disclosure of which is incorporated by reference herein in its entirety.

TECHNICAL FIELD

The present disclosure concerns methods for manufacturing polarizing lenses and polarizing lenses manufactured by the same, and more specifically, to methods for manufacturing polarizing lenses without use of a lower zig, upper zig, lower stand, and upper stand and without forming notches in the polarizing lens, and polarizing lenses manufactured by the same.

DISCUSSION OF RELATED ART

Polarizing lenses may be used to reduce glare to, e.g., help safer driving. There are a few conventional methods for manufacturing polarizing lenses. The conventional methods, however, require the formation of notches in the polarizing film or use of gasket molds or zigs and stands, rendering the process quite complicated and burdensome.

SUMMARY

According to an embodiment of the present disclosure, a method for manufacturing a polarizing lens comprises taping an upper mold using first tape, applying a first resin composition onto a concave surface of the upper mold, forming a polarizing film on the first resin composition, performing first polymerization on the upper mold including the first resin composition and the polarizing film, spacing the upper mold apart from a lower mold, taping the upper mold and the lower mold using second tape, injecting a second resin composition into a space between the polarizing lens and the lower mold, and performing second polymerization on the upper mold including the gel-state upper lens coupled with the polarizing lens, the second resin composition, and the lower mold.

Taping using the first tape may be performed with the concave surface of the upper mold facing upwards to be higher than a thickness of the upper mold.

The first polymerization may include pre-heating performed for about five minutes at about 15° C. and polymerization performed for about six hours at about 15° C., for about four hours at about 15° C. to about 60° C., for about ten hours at about 60° C., and for about two hours at about 60° C. to about 15° C.

The second polymerization may include pre-heating performed for about five minutes at about 25° C. and polymerization performed for about seven hours at about 25° C. to about 40° C., for about three hours at about 40° C. to about 50° C., for about two hours at about 50° C. to about 65° C., for about three hours at about 65° C. to about 95° C., for about one hour at about 95° C. to about 120° C., for about two hours at about 120° C., and for about two hours at about 120° C. to about 70° C.

According to an embodiment of the present disclosure, there is provided a polarizing lens manufactured by the method.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. It will be understood that when an element or layer is referred to as being "on," "connected to," "coupled to," or "adjacent to" another element or layer, it can be directly on, connected, coupled, or adjacent to the other element or layer, or intervening elements or layers may be present. As used herein, the singular forms "a," "an," and "the" are intended to include the plural forms as well, unless the context clearly indicates otherwise.

The conventional method for manufacturing polarizing lenses using taping eliminates the need for a gasket mold but requires sophisticated upper and lower jigs or a jig, lower stand, upper stand, and formation of notches on the polarizing film.

According to an embodiment of the present disclosure, first polymerization may be conducted at about 15° C. to about 60° C. to form a gel-state lens on a polarizing film, and second polymerization may then be conducted at about 25° C. to about 120° C. to form a polarizing lens, eliminating the need for a lower zig, upper zig, lower stand, and upper stand. Therefore, work efficiency may be increased, and manufacturing costs may be saved.

Figure 1:
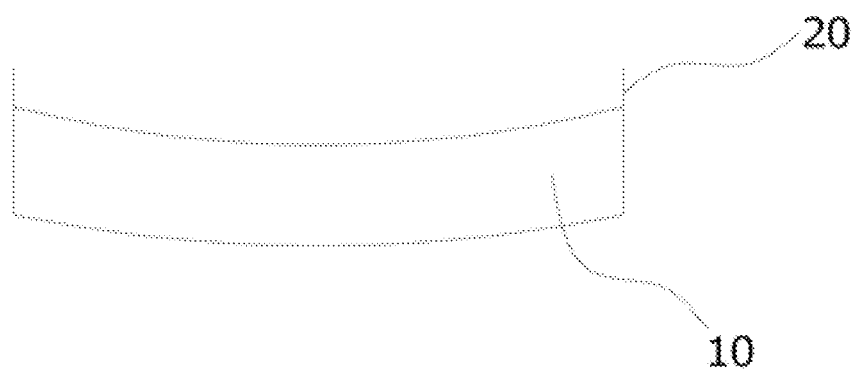
FIG. 1 is a view illustrating taping an upper mold using a first tape according to an embodiment of the present disclosure.
Figure 2:
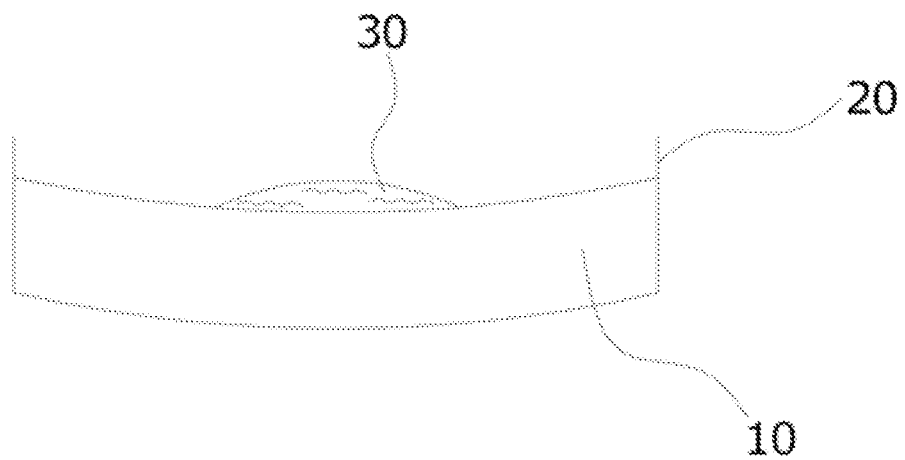
FIG. 2 is a view illustrating applying a first resin composition onto a concave surface of an upper mold according to an embodiment of the present disclosure.
Figure 3:
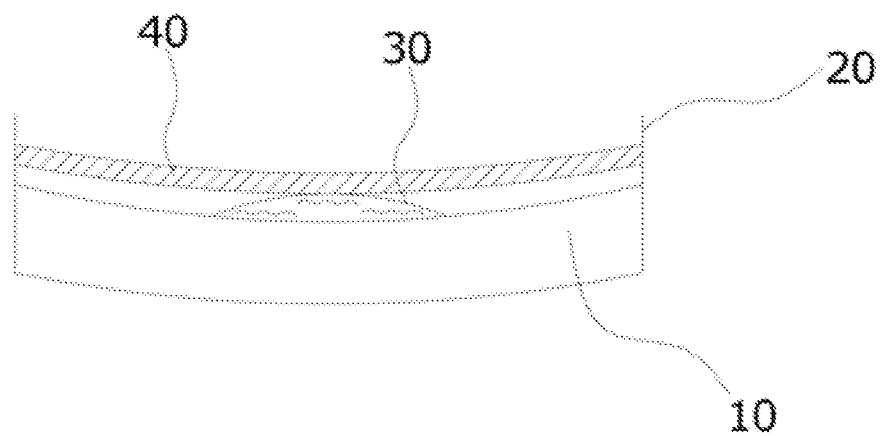
FIG. 3 is a view illustrating forming a polarizing film on a first resin composition applied onto a concave surface of an upper mold according to an embodiment of the present disclosure.
Figure 4:
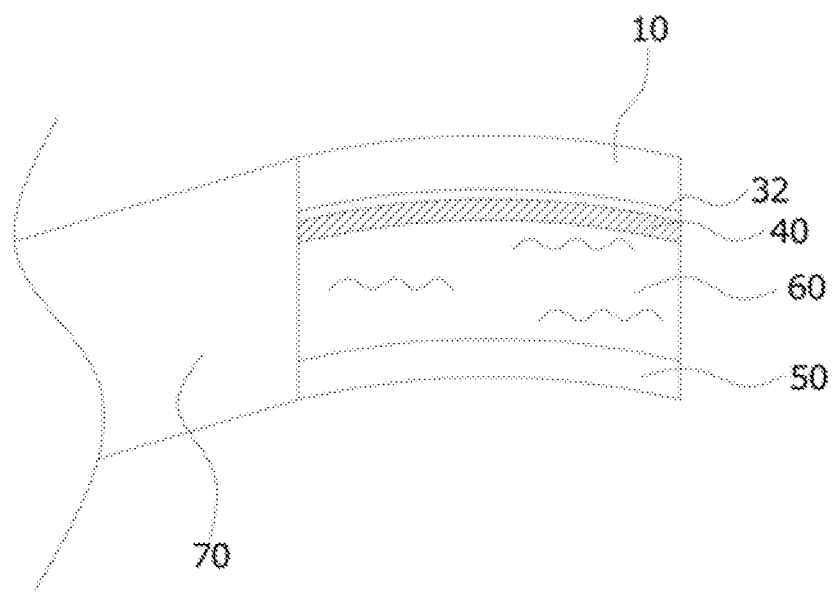
FIG. 4 is a view illustrating spacing an upper mold including a polarizing lens coupled with a gel-state upper lens formed by performing first polymerization on a first resin composition apart from a lower mold and taping the upper mold and the lower mold using a second tape according to an embodiment of the present disclosure.
Figure 5:
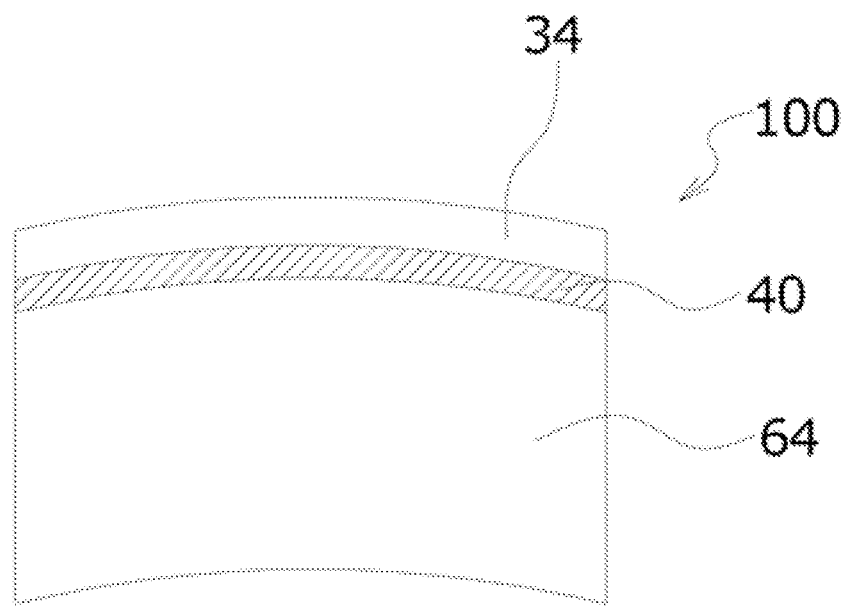
FIG. 5 is a view illustrating a polarizing lens according to an embodiment of the present disclosure.

FIG. 1 is a view illustrating taping an upper mold using a first tape according to an embodiment of the present disclosure. FIG. 2 is a view illustrating applying a first resin composition onto a concave surface of an upper mold according to an embodiment of the present disclosure. FIG. 3 is a view illustrating forming a polarizing film on a first resin composition applied onto a concave surface of an upper mold according to an embodiment of the present disclosure. FIG. 4 is a view illustrating spacing an upper mold including a polarizing lens coupled with a gel-state upper lens formed by performing first polymerization on a first resin composition apart from a lower mold and taping the upper mold and the lower mold using a second tape according to an embodiment of the present disclosure. FIG. 5 is a view illustrating a polarizing lens according to an embodiment of the present disclosure.

According to an embodiment of the present disclosure, a method for manufacturing a polarizing lens includes taping an upper mold 1 using first tape 20 (step 1), applying a first resin composition 30 onto a concave surface of the upper mold 10 (step 2), forming a polarizing film 40 on the first resin composition 30 (step 3), performing first polymerization on the upper mold 10 (step 4), spacing the upper mold 10 including the polarizing lens 30 coupled with a gel-state upper lens 32 formed by the first polymerization of the first resin composition 30 apart from a lower mold 50 and taping the upper mold 10 and the lower mold 50 using second tape 70 (step 5), injecting a second resin composition 60 through a space between the polarizing lens 40 and the lower mold 50 (step 6), and performing second polymerization on the upper mold 10 including the gel-state upper lens 32 coupled with the polarizing lens 40, the second resin composition 60, and the lower mold 50 (step 7).

The upper mold 10 may include a glass mold washed with pure water. For example, as the upper mold 10, a glass mold washed with pure water may be used. In step 1, the upper mold 10 may be positioned so that a convex surface of the upper mold 10 faces downwards, and a concave surface of the upper mold 10 faces upwards. The first tape 20 may include a thermal-resistant tape. For example, the taping may be done to be higher than a width of the upper mold 10, preventing the first resin composition 30 from coming out of the concave surface.

Referring to FIG. 2, in step 2, the first resin composition 30 is applied onto the concave surface of the upper mold 10 by dropping or injecting the first resin composition 30 to the concave surface using an injection device. The amount of first resin composition 30 applied is not specially limited. However, when the amount of the first resin composition 30 applied is too small, the upper lens 34 of the polarizing film 40 may become too thin, and when the amount of the first resin composition 30 applied is too much, the upper lens 34 of the polarizing film 40 may become too thick, rendering it difficult to manufacture a high-refractive polarizing lens 100.

For example, about 15 g of the first resin composition 30 may be dropped onto the concave surface of the upper mold 10 using an injection device.

According to an embodiment of the present disclosure, the thickness of the upper lens 34 of the polarizing film 40 may be adjusted by the amount of the first resin composition 30. For example, the upper lens 34 of the polarizing film 40 may be formed to have a thickness of about 0.3 mm to about 0.8 mm.

The first resin composition 30 is not specially limited in type thereof, and various resin compositions may be used to manufacture the polarizing lens 100.

For example, the first resin composition 30 may be formed by mixing and dissolving a liquid-state monomer, e.g., urethane, an ultra violet (UV) absorbent, a release agent, and a catalyst to form a homogenized solution and defoaming the mixed solution.

Defoaming the mixed solution may be performed at about 1 pascal (Pa) for about one hour.

For example, as the urethane monomer, KOC 6042 commercially available from KOC Solution Co., Ltd. may be used. The urethane monomer used may be of about 99.94 weight %.

The UV absorbent may include, but is not limited to, 2-(2'-hydroxy-5-methylphenyl)-2H-benzotriazole; 2-(2'-hydroxy-3',5'-di-t-butyl-phenyl)-5-chloro-2H-benzotriazole; 2-(2'-hydroxy-3'-t-butyl-5'-methylphenyl)-5-chloro-2H-benzotriazole; 2-(2'-hydroxy-3',5'-di-t-amyl phenyl)-2H-benzotriazole; 2-(2'-hydroxy-3',5'-di-t-butylphenyl)-2H-benzotriazole; 2-(2'-hydroxy-5'-t-butylphenyl)-2H-benzotriazole; 2-(2'-hydroxy-5'-t-octylphenyl)-2H-benzotriazole; 2,4-dihydroxybenzophenone; 2-hydroxy-4-methoxybenzophenone; 2-hydroxy-4-octyloxybenzophenone; 4-dodecyloxy-2-hydroxybenzophenone; 4-hydroxy-benzo-2-hydroxy benzophenone; 2,2',4,4'-tetrahydroxy-benzophenone; 2,2'-dihydroxy-4,4'-dimethoxy benzophenone, or a mixture thereof.

For example, as the UV absorbent, HIUV31A commercially available from KOC Solution Co., Ltd. may be used. The UV absorbent used may be of about 0.03 weight %.

The release agent may include, but is not limited to, a phosphoric acid ester compound added with isopropyl phosphate; diisopropyl phosphate; butyl phosphate; octyl phosphate; dioctyl phosphate; isodecyl phosphate; diisodecyl phosphate; tridecanol phosphate; bis (tri-decanol) phosphate, acidic phosphonic ester, ethylene oxide or propylene oxide.

For example, as the release agent, HILUB UN commercially available from KOC Solution Co., Ltd. may be used. The release agent used may be of about 0.01 weight %.

The catalyst may include, but is not limited to, as a radical polymerization initiator, a peroxide, including, but not limited to, benzoyl peroxide, p-chlorobenzoyl peroxide, lauroyl peroxide, acetyl peroxide, di-t-butyl peroxide, 1,1-di-t-butyl peroxy-3,3,5-trimethylcyclohexane, t-butylperoxy pivalate, t-butyl peroxy-2-ethylhexanoate, t-butyl peroxybenzoate, bis(4-t-butylcyclohexyl) peroxydicarbonate, diisopropyl peroxydicarbonate, or t-butyl peroxy isopropyl carbonate, a azo compounds, such as, e.g., azobisisobutyronitrile, or a mixture of two or more thereof.

For example, as the catalyst, HICAT DC commercially available from KOC Solution Co., Ltd. may be used. The catalyst used may be of about 0.12 weight %.

Referring to FIG. 3, in step 3, the polarizing film 40 is formed on the first resin composition 30 on the concave surface of the upper mold 10. The polarizing film 40 may be formed to have a predetermined diameter. The polarizing film 40 may be formed to have a predetermined curvature corresponding to a curvature of the electronic device 100 to be manufactured.

In step 4, the upper mold 10 including the first resin composition 30 and the polarizing film 40 formed on the first resin composition 30 is subjected to the first polymerization.

According to an embodiment of the present disclosure, the upper mold 10 including the first resin composition 30 and the polarizing film 40 may be placed in a polymerization oven for the first polymerization. The first resin composition 30 may form a gel-state upper lens 32 that is coupled with the polarizing film 40.

According to an embodiment of the present disclosure, the first polymerization may be performed, in the polymerization pre-heated for about five minutes at up to about 15° C., for about six hours at about 15° C., for four hours at about 15° C. to about 60° C., for about ten hours at about 60° C., and for two hours at about 60° C. to about 15° C.

Departing from the temperatures and the times, air bubbles and stains may be created, resulting in defects. By meeting the temperature and time conditions, the first resin composition 30 may turn into the gel-state upper lens 32 that may be coupled with the polarizing film 40.

After the first polarization, the upper mold 10 in which the gel-state upper lens 32 formed by the first polarization of the first resin composition 30 is coupled with the polarizing film 40 is pulled out of the polarization oven and is positioned so that the convex surface of the upper mold 10 faces upwards and the polarizing film 40 faces downwards.

Referring to FIG. 4, in step 5, the upper mold 10 in which the gel-state upper lens 32 formed by the first polymerization of the first resin composition 30 is coupled with the polarizing film 40 is spaced apart from the lower mold 50, and the upper mold 10 and the lower mold 50 are taped using the second tape 70.

The lower mold 50 may include a glass mold washed with pure water. The lower mold 50 may be formed to have the same or substantially the same size as the upper mold 10.

The lower mold 50 is spaced apart from the upper mold 10 at a predetermined distance, with a convex surface of the lower mold 50 facing upwards and a concave surface of the lower mold 50 facing downwards.

The second tape 70 may include thermal-resistance tape.

Spacing and taping the upper mold 10 and the lower mold 50 may be performed by a known method.

In step 6, the second tape 70 may be partially removed, and the second resin composition 60 may be injected into a space between the polarizing film 40 and the lower mold 50. The second resin composition 60 may be the same or substantially the same as the first resin composition 30.

In step 7, the upper mold 10 including the upper lens 32 and the polarizing film 40, the second resin composition 60, and the lower mold 50 are placed in a polymerization oven and are subjected to the second polymerization.

According to an embodiment of the present disclosure, the second polymerization may be performed, in the polymerization oven pre-heated for about five minutes at up to about 25° C., for about seven hours at about 25° C. to about 40° C., about three hours at about 40° C. to about 50° C., for about two hours at about 50° C. to about 65° C., for about three hours at about 65° C. to about 95° C., for about one hour at about 95° C. to about 120° C., for two hours at about 120° C., and for about two hours at about 120° C. to about 70° C. Departing from the temperatures and the times, air bubbles and stains may be created, resulting in defects.

After the second polymerization, the upper mold 10, the upper lens 34, the polarizing film 40, a lower lens 64, and the lower mold 50, which are sequentially formed, are pulled out of the polymerization oven. The first tape 20 and the second tape 70 are removed, the upper mold 10 and the lower mold 50 are separated from each other and are washed and thermally treated, thus forming the polarizing lens 100.

According to an embodiment of the present disclosure, the electronic device 100 may be formed by taping, instead of using gasket molds, eliminating the need for a lower zig, upper zig, lower stand, and upper stand. Further, upon forming the electronic device 100, notches need not be formed in the polarizing lens. According to an embodiment of the present disclosure, the electronic device 100 may be manufactured in a simplified manner by a method including the first polymerization and the second polymerization.

According to an embodiment of the present disclosure, a method for manufacturing a polarizing lens 100 enables an upper lens 34 of a polarizing film 40 to be formed at a thickness of about 0.3 mm to about 0.8 mm, thus allowing for a high-refractive polarizing lens 100 having a refractive index (ND) of about 1.592 or more.

According to an embodiment of the present disclosure, the polarizing film 40 may be evenly formed at a predetermined position in the electronic device 100.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A method for manufacturing a polarizing lens, the method comprising:
    taping an upper mold using first tape;
    applying a first resin composition onto a concave surface of the upper mold;
    forming a polarizing film on the first resin composition;
    performing first polymerization on the first resin composition to form a gel-state upper lens;
    spacing the upper mold apart from a lower mold;
    taping the upper mold and the lower mold using second tape;
    injecting a second resin composition into a space between the polarizing film and the lower mold; and
    performing second polymerization on the gel-state upper lens and the second resin composition, wherein the first polymerization includes pre-heating preformed for about five minutes at about 15° C. and polymerization performed for about six hours at about 15° C., for about four hours at about 15° C. to about 60° C., for about ten hours at about 60° C., and for about two hours at about 60° C. to about 15° C.

2. A method for manufacturing a polarizing lens, the method comprising:
    taping an upper mold using first tape;
    applying a first resin composition onto a concave surface of the upper mold;
    forming a polarizing film on the first resin composition;
    performing first polymerization on the first resin composition to form a gel-state upper lens;
    spacing the upper mold apart from a lower mold;
    taping the upper mold and the lower mold using second tape;
    injecting a second resin composition into a space between the polarizing film and the lower mold; and
    performing second polymerization on the gel-state upper lens and the second resin composition, wherein the second polymerization includes pre-heating performed for about five minutes at about 25° C. and polymerization performed for about seven hours at about 25° C. to about 40° C., for about three hours at about 40° C. to about 50° C., for about two hours at about 50° C. to about 65° C. for about three hours at about 65° C. to about 95° C., for about one hour at about 95° C. to about 120° C., for about two hours at about 120° C., and for about two hours at about 120° C. to about 70° C.

* * * * *